Oct. 28, 1930.  W. L. SIMPSON  1,779,830
CREAM SEPARATOR
Filed Aug. 7, 1928
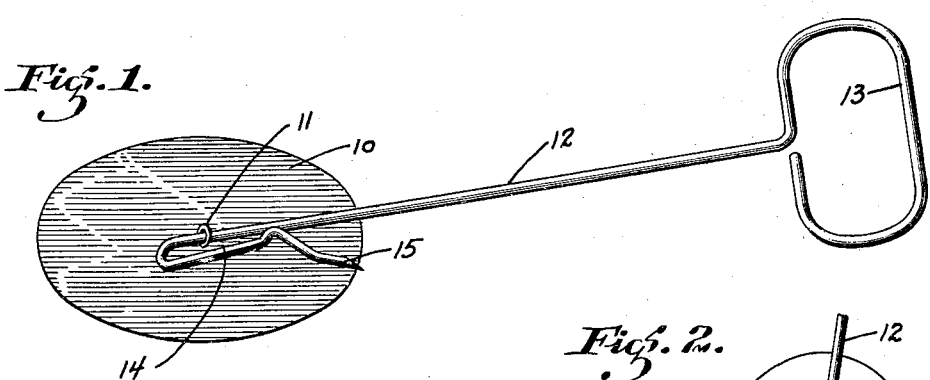
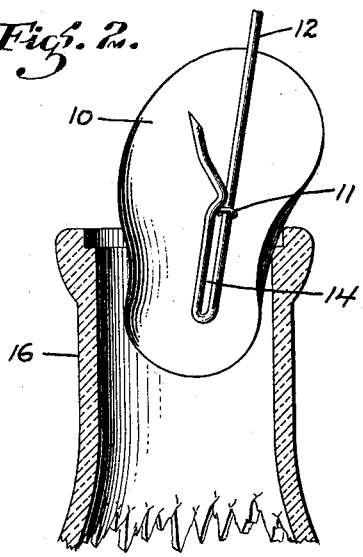
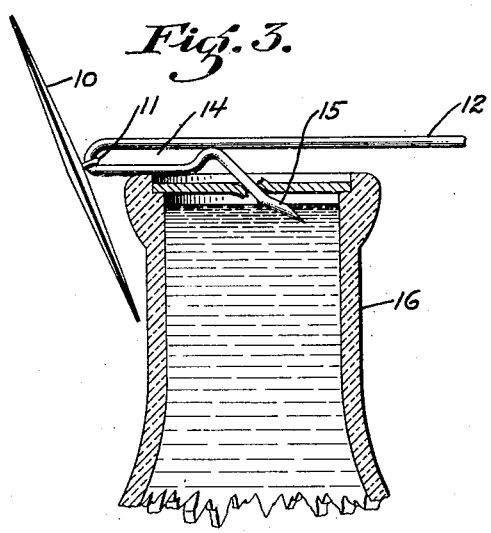
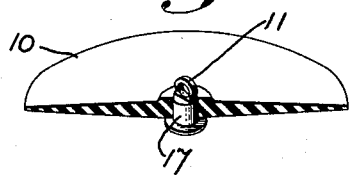
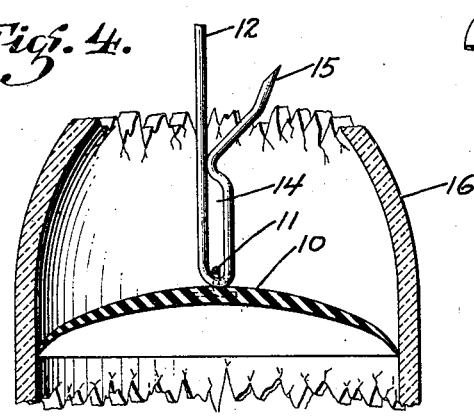
INVENTOR.
William L. Simpson.
BY Townsend, Loftus & Abbett
ATTORNEYS.

Patented Oct. 28, 1930

1,779,830

UNITED STATES PATENT OFFICE

WILLIAM L. SIMPSON, OF OAKLAND, CALIFORNIA

CREAM SEPARATOR

Application filed August 7, 1928. Serial No. 297,985.

My present invention relates to a novel type of cream separator for use with bottles of the type in which milk is generally distributed.

The main object of my invention is to provide a practical, efficient and easily operated device which can be used for separating the cream from the milk as it is received from the dairy.

Other objects and advantages of my invention will be disclosed in the following description and explanation which will be more readily understood when read in combination with the accompanying drawing, in which an embodiment of my invention is shown. It should be understood that various changes and modifications may be made without departing from the spirit of my invention and all such modifications are intended to be covered which fall within the scope of the appended claims.

In the drawings—

Figure 1 is a perspective view of a preferred type of separator,

Figure 2 shows the separator illustrated in Figure 1 being inserted through the neck of a bottle, Figure 3 illustrates the manner of using my improved device for the purpose of removing the bottle cap, Figure 4 is a fragmentary view showing the position which my improved separator takes when in the position suitable for separating the cream, and Figure 5 is a perspective view, partially in section, of an improved form of disk and coupling eyelet.

Various forms of devices of this nature have been proposed in the past but none of them possess the novel features presented herein, wherein the flexible disk member may be inserted through the neck of the bottle without being touched by the hand of the operator. This is an important and novel feature which is accomplished by the provision of an elongated eyelet at the end of the disk operating handle to which the disk is attached so that it may slide freely within the limits of the above eyelet and into a position adjacent the side of the handle so that the projecting end of the handle can be used in cooperation with the neck of the bottle to curl the disk so that it will readily slip through the bottle neck and into position.

For a better understanding of my invention, reference should be had to the accompanying drawing, wherein 10 designates a flexible disk which, in the preferred form of my invention, is of rubber. It should be understood, however, that this disk 10 may be made of any other suitable flexible material, the flexibility being necessitated by reason of the fact that it must be distorted or curled in being inserted through the neck of the bottle. At the center of the disk 10 I provide a small eyelet 11 which may be permanently secured to the disk 10 or made removable therefrom, as illustrated in Figure 5. Secured to the disk 10 I provide a handle member 12 having a handle 13 which forms a grip thereon. The opposite end of the handle member 12 is passed through the eyelet 11 and bent back upon itself to form an elongated loop 14 so that the disk 10 will have a certain freedom of movement up and down along the handle member 12. The end of the turned back portion of the member 12 which forms the loop 14 is bent outwardly and sharpened to form a spike 15 which can be utilized in removing the bottle cap, as illustrated in Figure 3.

In Figure 2 of the drawing I show my improved separator in the position it will assume when being inserted through the neck of a milk bottle which I have designated by the numeral 16. In this figure it will be seen that the eyelet 11 has assumed a position adjacent the upper extreme end of the elongated loop 14 and that the loop extends along the disk 10 so that it can be used to exert a downward pressure upon the disk to thereby force it to curl and thus be easily inserted through the neck of the bottle 16 without having to touch the disk, as is the case in all prior art devices of which I am aware. From a sanitary point of view this is very important as it will prevent the contamination of the milk by unclean hands for it will not be necessary to touch the disk under any circumstances in order to insert the same.

After the disk 10 has been inserted through the bottle neck, it will then fall down and the eyelet 11 will assume a position at the lower end of the loop 14 where it will remain as an upward pull is exerted upon the handle 12. This will draw the disk 10 upwardly within the bottle and distort the same substantially as shown in Figure 4. After the disk is drawn into this position, the cream can then be poured off without fear of any milk becoming mixed therewith and, in fact, I have discovered that after the disk has been pulled up into the position shown in Figure 4, the bottle may even be thrown around and rolled on the floor without the possibility of any milk escaping therefrom as the disk will entirely seal the contents of the bottle so as to prevent the entrance of air therein which would vent the enclosed compartment and permit the escape of milk.

In Figure 5 the eyelet 10 is shown as formed upon a member 17 having the shape of a stud or collar button which can be readily inserted through the disk and removed therefrom so that a boiling and thorough cleaning of the disk and other parts is made possible, thus eliminating the possibility of an accumulation of foreign matter at the coupling. In this connection it should be noted that the material of the handle member 12 possesses sufficient resilience to permit the flexing of the bent portion at the loop 14 so as to permit the eyelet 11 to be freely slipped over the barb 15 and into the loop 14.

It will also be observed that when it is desired to remove the disk from the bottle, the operation will also be simplified by reason of the elongation of the loop 14 as, under these conditions, the disk will be forced downwardly into the milk and, by a pressure against the side of the bottle, the loop 14 may be passed down upon the eyelet 11 so that the disk can be curled against the side of the bottle and thus withdrawn again through the neck thereof. This feature, however, is not so important in withdrawing the disk as the disk, upon being pressed against the side of the bottle, will always assume a curl conforming to the inner surface of the bottle, whereas in inserting the same at the top it would be impossible to curl the disk without either pressing down upon the edge thereof at the neck of the bottle, as is now accomplished by the extending loop 14, or by pinching the opposite edges between the fingers to thereby curl the same.

From the above it will be seen that my improved separator disk can be readily inserted through the neck of a bottle by a simple manipulation of the handle member 12 without the necessity of touching the disk in any manner other than against the bottle neck.

Having thus described my invention, what I claim and desire to secure by Letters Patent is—

1. A cream separator for use with milk bottles comprising a flexible disk member adapted to be placed in the bottle, a handle secured to said disk for inserting and withdrawing the same, and an elongated eyelet formed upon said handle extending longitudinally of the handle and to which said disk is attached, said disk being slidably connected to said eyelet whereby the disk may be held flatwise against said handle to facilitate its entry through the neck of the bottle.

2. A cream separator for use with milk bottles comprising a flexible disc member adapted to be placed in the bottle, an eyelet detachably secured to the center of said disc, and a handle consisting of a relatively rigid piece of wire having an annular finger loop formed in one of its ends and an elongated longitudinally extending loop formed in its other end adapted to slidably engage said eyelet, the wire forming said elongated loop terminating in a pointed section for use in combination with said handle and said elongated loop for removing bottle caps.

WILLIAM L. SIMPSON.